United States Patent [19]

Hamane et al.

[11] Patent Number: 4,497,111
[45] Date of Patent: Feb. 5, 1985

[54] COIL INSERTING APPARATUS

[75] Inventors: Tokuhito Hamane; Masaaki Tasai, both of Hirakata; Tadashi Kubota, Katano, all of Japan

[73] Assignee: Matsushita Electric Industrial Co., Ltd., Kadoma, Japan

[21] Appl. No.: 441,361

[22] Filed: Nov. 12, 1982

[30] Foreign Application Priority Data

Nov. 20, 1981 [JP] Japan ................... 56-187533

[51] Int. Cl.³ .............................. H02K 15/06
[52] U.S. Cl. .............................. 29/734; 29/736
[58] Field of Search ............... 29/732, 734, 736, 596, 29/606

[56] References Cited

U.S. PATENT DOCUMENTS

| 2,432,267 | 12/1947 | Adamson | 29/736 |
| 3,324,536 | 6/1967 | Hill | 29/736 |
| 4,047,293 | 9/1977 | Kieffer | 29/736 |
| 4,296,543 | 10/1981 | Hamane et al. | 29/596 |
| 4,304,045 | 12/1981 | Barrera | 29/736 |
| 4,433,475 | 2/1984 | Kubota et al. | 29/736 |

Primary Examiner—Carl E. Hall
Attorney, Agent, or Firm—Wenderoth, Lind & Ponack

[57] ABSTRACT

A coil inserting apparatus for inserting coils into slots of a stator core of an electric rotary machine. The apparatus includes a plurality of groups of blades for guiding the coils into the slots, a plurality of blade holders, a coil pusher, a rotary driving means for driving the coil pusher and the plurality of the blade holders and a mechanism for converting a rotary motion into a linear reciprocating motion, so that the coil pusher and the plurality of the blade holders are caused to make linear reciprocating motions in the axial direction of the plurality of the blade holders.

2 Claims, 8 Drawing Figures

COIL INSERTING APPARATUS

BACKGROUND OF THE INVENTION

The present invention generally relates to a stator core for electric rotary machines such as electric motors, alternators, etc. and more particularly, to a coil inserting apparatus for inserting coils into slots of the stator core.

Conventionally, there have been employed a coil inserting apparatus of the fixed blade type as shown in FIG. 1, in which all blades (hereinbelow, referred to as "fixed blades") 3a are secured to a blade holder 2, as disclosed in U.S. Pat. No. 3,324,536, or the coil inserting apparatus of a movable blade type shown in FIG. 2, in which all blades (hereinbelow, referred to as "movable blades") 3b are secured to a coil pusher 5, as disclosed in U.S. Pat. No. 2,432,267, or the coil inserting apparatus of a movable blade type shown in FIG. 3, in which movable blades 3b and fixed blades 3a are provided and the movable blades 3b are secured to the coil pusher 5 with the fixed blades 3a being not secured to the coil pusher 5, as disclosed in U.S. Pat. No. 3,559,268.

However, the known coil inserting apparatus of the fixed blade type shown in FIG. 1 has drawbacks, such as that, since a large frictional resistance is produced between the fixed blades 3a and the coils, the coils are likely to be readily damaged during insertion thereof into slots of the stator core, and this known coil inserting apparatus can be used only with coils having wire diameters restricted within extremely narrow limits. It is to be noted here that the coils are prewound into the shape of closed loop and have two side portions and two end portions connecting the side portions. The prior art coil inserting apparatuses of the movable blade type shown in FIGS. 2 and 3 have an advantage that the resistance against the coil insertion is reduced, but are disadvantageous in that the coils are required to have the end portions of the coils increased in length in advance such that the coils are pushed upwardly in the axial direction of the blade holder 2. Thus, the known coil inserting apparatuses of the movable blade type have the disadvantage that, since an extremely large force is applied to the movable blades 3b and the coils, the coil inserting apparatuses of the movable blade type cannot be used stators having a winding in which the coil length is reduced to a length as short as possible and in which the opposite end portions of the coils are reduced in height so as to obtain compact electric motors, etc. accommodating the stators therein. Furthermore, since it is generally rather difficult to convert the coil inserting apparatuses of the fixed blade type to the coil inserting apparatuses of the movable blade type or vice versa, two kinds of coil inserting apparatuses, namely a coil inserting apparatus of the fixed blade type and a coil inserting apparatus of the movable blade type, are required to be provided, for example, in the case where two kinds of coils, one having a small insertion resistance force and the other having a large insertion resistance force, are required to be properly inserted into the slots of the same stator core.

Furthermore, in the known coil inserting apparatuses of the fixed blade type and the movable blade type, where the stator cores have different stack heights, bolts 1 in FIGS. 1 to 3 are loosened and then the blade holder 2 is pushed upwardly or downwardly such that the distance between upper ends of the fixed blades 3a and the movable blades 3b and upper ends of wedge guides 4 is set to a value of each of the stack heights plus a certain allowance and finally, then the bolts 1 and tightened, which requires tedious and time-consuming operations. Thus, the prior art coil inserting apparatuses of the fixed blade type and the movable blade type are inconven that a long time period is required for changeover to respective stack heights, in the production of stator cores having various stack heights.

In order to eliminate the above-described drawbacks of the conventional coil inserting apparatuses, the present inventors have previously proposed a coil inserting apparatus provided with a plurality of driving sources in U.S. patent application Ser. No. 321,928 filed November 16, 1981, now U.S. Pat. No. 4,433,475, as shown in FIG. 4. However, the coil inserting apparatus referred to above has such problems as that, since cylinders 10, 11 and 12 act as the driving sources and are not on a common axis, it is difficult to provide precise control of the speed of the coil pusher 13 and blades 14, and the overall length of the coil inserting apparatus is very large and the coil inserting apparatus is limited, in application, to stators having large sizes to some extent.

SUMMARY OF THE INVENTION

Accordingly, an essential object of the present invention is to provide an improved coil inserting apparatus comprising blades and a coil pusher, in which the force of resistance to insertion of coils into slots of a stator core is reduced and the blades and the coil pusher can be displaced with optimum timing and speed in accordance with the winding specifications of the stator such that coils having a short coil length, having end portions low in height, can be inserted into the slots of the stator core, with substantial elimination of the disadvantages inherent in conventional coil inserting apparatuses of this kind.

Another object of the present invention is to provide an improved coil inserting apparatus of the above described type which has a simple structure, is highly reliable in actual use and suitable for mass production at low cost.

In accomplishing these and other objects according to one preferred embodiment of the present invention, there is provided an improved coil inserting apparatus for inserting coils into slots of a stator core of an electric rotary machine, comprising: a plurality of groups of blades for guiding the coils into the slot and which are provided in a circular array such that each blade is spaced a predetermined distance from adjacent blades; a plurality of blade holder, one for each group of said blades, which hold the plurality of the groups of said blades, respectively such that each group of said blade are movable independently of the other groups of said blades in the axial direction of the plurality of said blade holders; a coil pusher which is adapted to be moved in the axial direction of the plurality of said blade holders so as to drive the coils into the slots such that said coil pusher is guided by the plurality of the groups of said blades; a rotary driving means for driving said coil pusher and the plurality of said blade holders; and a mechanism for converting rotary motion into a linear reciprocating motion, whereby said coil pusher and the plurality of said blade holders are caused to make linear reciprocating motions in the axial direction of the plurality of said blade holders.

In accordance with the present invention, since the coil pusher and the blade holders are driven by the rotary driving means which can be controlled easily, the speed of the coil pusher and the blades can be arbitrarily set to an optimum value for inserting the coils into the slots of the stator core in the coil inserting process.

BRIEF DESCRIPTION OF THE DRAWINGS

These and other objects and features of the present invention will become apparent from the following description of a preferred embodiment thereof taken together with the accompanying drawings, in which.

Before the description of the present invention proceeds, it is to be noted that like parts are designated by like reference numerals throughout the several views of the accompanying drawings.

DETAILED DESCRIPTION OF THE INVENTION

Figure 1:
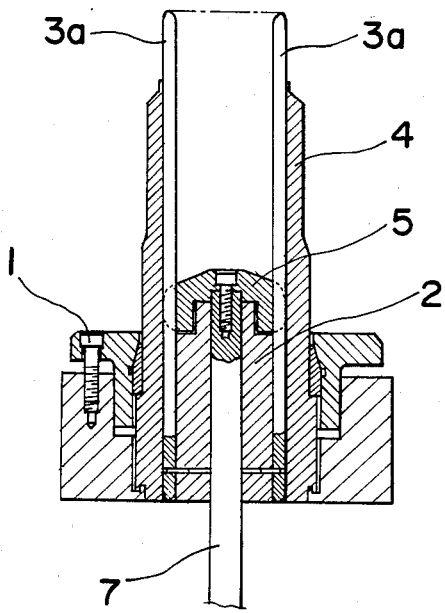
FIGS. 1 to 4 are front elevational views partly in section, showing conventional coil inserting apparatuses (already referred to)
Figure 2:
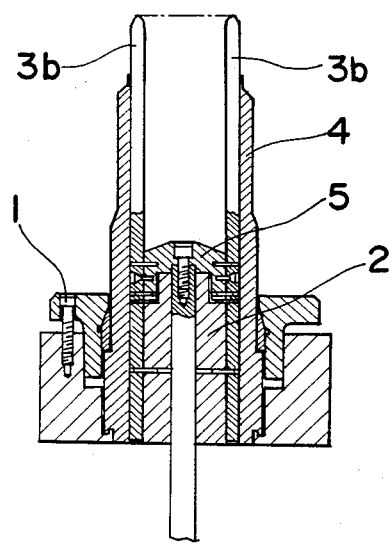
Figure 3:
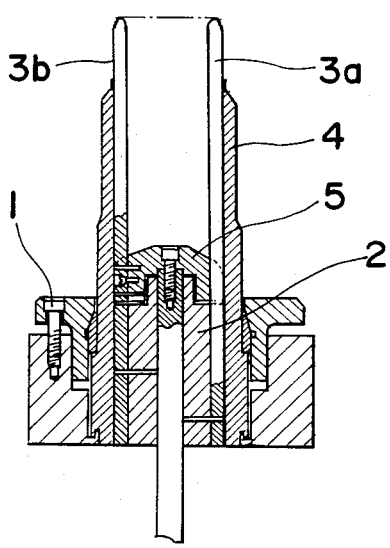
Figure 4:
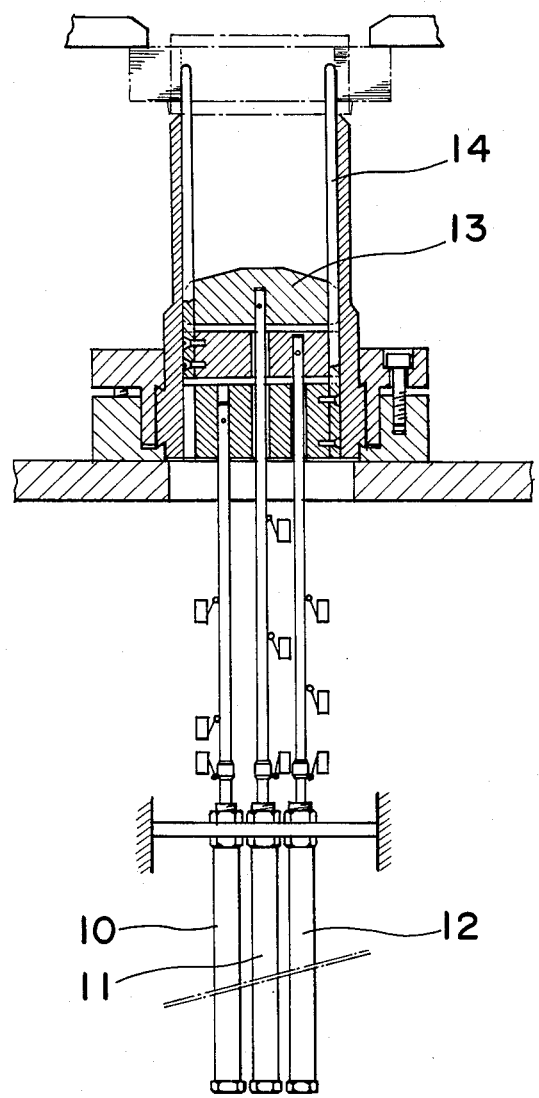
Figure 5:
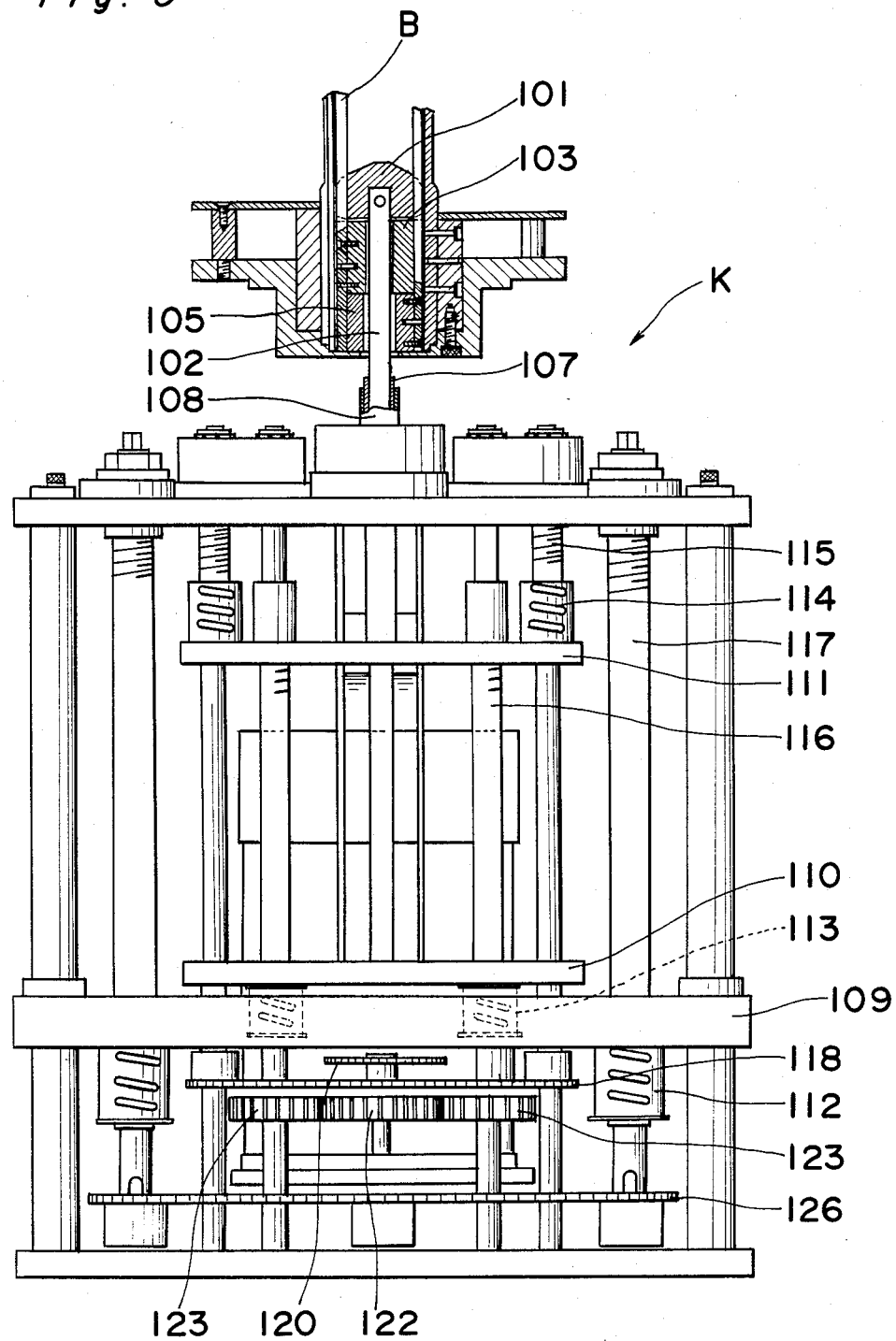
FIG. 5 is a front elevational view of a drive unit of a coil inserting apparatus according to one preferred embodiment of the present invention.
Figure 6:
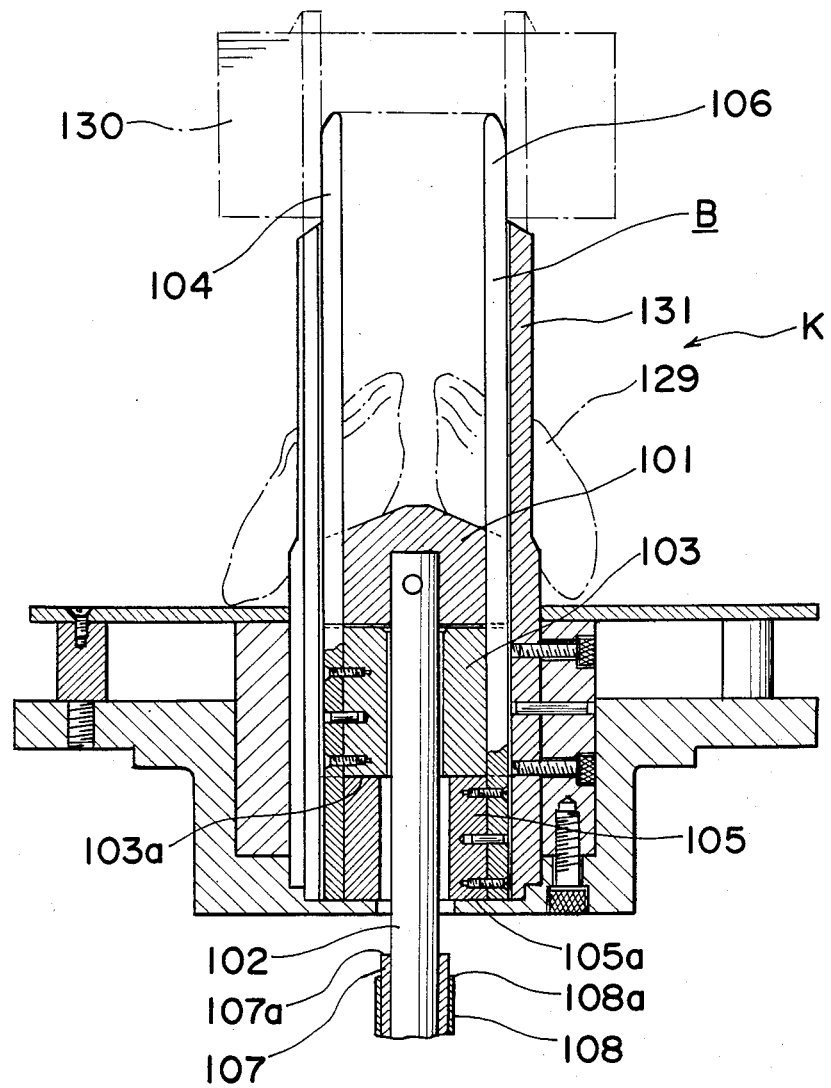
FIG. 6 is a front elevational view partly in section, showing a coil inserting jig of the coil inserting apparatus of FIG. 5.
Figure 7:
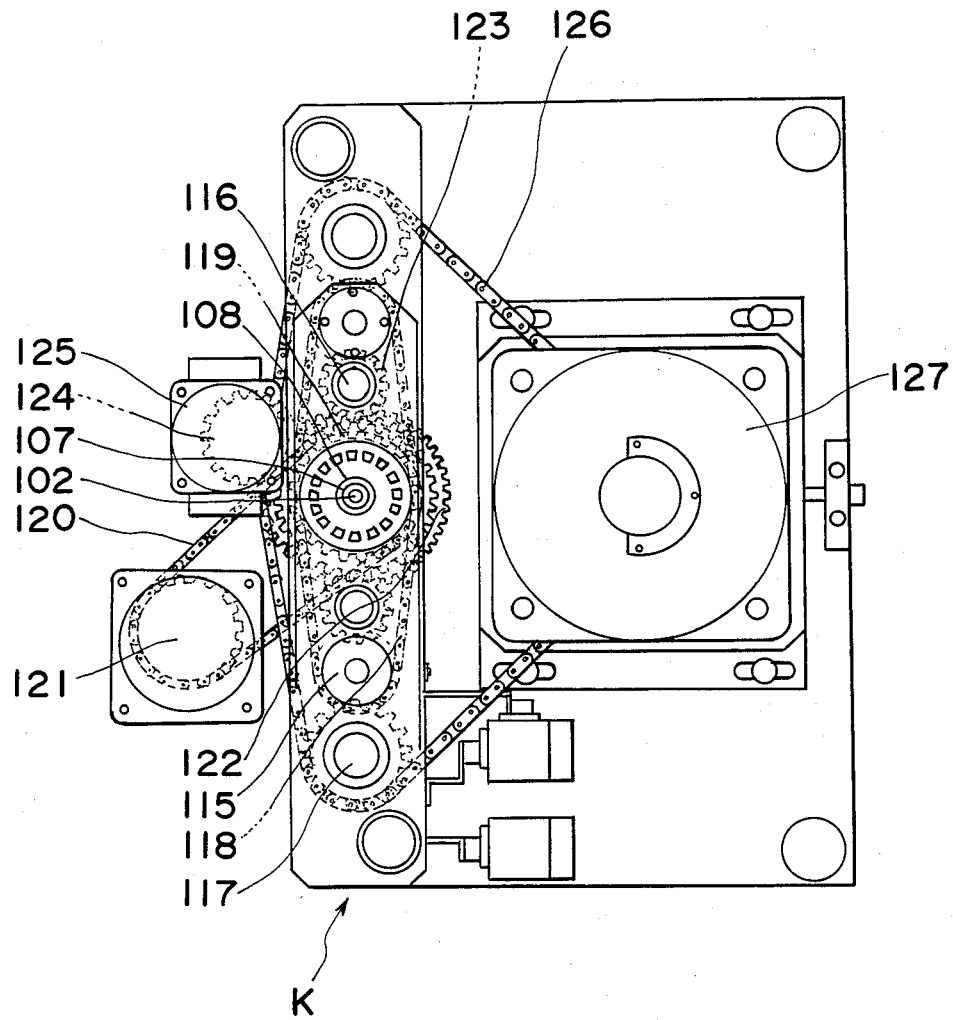
FIG. 7 is a top plan view of the drive unit of FIG. 5.

Referring now to the drawings, there is shown in FIGS. 5 to 7, a coil inserting apparatus K according to one preferred embodiment of the present invention. The coil inserting apparatus K includes a coil pusher 101, a shaft 102, a plurality of blades B provided in a circular array, a first blade holder 103, a second blade holder 105, a first hollow shaft 107 and a second hollow shaft 108. A circular array of wedge guides 131 is fixedly mounted around the blades B. The shaft 102 to which the coil pusher 101 is secured is on the central axis of the array of blades B and is movable upwardly and downwardly. It is to be noted here that all directional indications such as "upward", "downward", etc. relate to the illustrations in FIGS. 5 and 6, hereinbelow.

The blades B comprise a first group of blades 104 and a second group of blades 106 with the blades of the first group of blades 104 alternating with the blades of the second group of blades 106. The first blade holder 103 to which the first group of blades 104 are secured is provided below the coil pusher 101, and is provided with a bore for receiving the shaft 102 so as to be slidable upwardly and downwardly with respect to the shaft 102. The second blade holder 105 to which the second group of blades 106 are secured is provided below the first blade holder 103, and is provided with a bore to permit the shaft 102 to pass therethrough such that the second blade holder 105 is slidable upwardly and downwardly with respect to the shaft 102. It is to be noted that the bore diameter of the second blade holder 105 is larger than that of the first blade holder 103.

Furthermore, the first hollow shaft 107 is provided below the second blade holder 105 and is coaxial with the shaft 102 and surrounds the shaft 102, and is slidable independently of the shaft 102. The bore in the second blade holder 105 is large enough so that, when the first hollow shaft 107 is moved upward, the upper end 107a of the first hollow shaft 107 is caused to pass through the bore of the second blade holder 105 so as to be brought into contact with a lower end 103a of the first blade holder 103 for pushing the first blade holder 103 upwardly. Moreover, the second hollow shaft 108 is provided below the second blade holder 105 and coaxially with the shaft 102 so as to surround the first hollow shaft 107, and is slidable independently of the shaft 102 and the first hollow shaft 107. It should be noted that the bore of the second blade holder 105 permits the first hollow shaft 107 to pass therethrough, but does not permit the second hollow shaft 108 to pass therethrough. Accordingly, when the second hollow shaft 108 is moved upwardly, the upper end 108a of the second hollow shaft 108 is brought into contact with a lower end 105a of the second blade holder 105 for pushing the second blade holder 105 upwardly.

Moreover, the shaft 102, first hollow shaft 107 and a second hollow shaft 108 are, respectively, secured to plates 109, 110 and 111 on which a pair of ball screw nuts 112, a pair of a ball screw nuts 113, and a pair of ball screw nuts 114 are fixedly mounted, respectively. A pair of ball screw shafts 117 meshing with the pair of ball screw nuts 112 are mounted on the machine frame in parallel with the shaft 102. Likewise, a pair of ball screw shafts 116 meshing with the pair of ball screw nuts 113, and a pair of ball screw shafts 115 meshing with the pair of ball screw nuts 114 are mounted on the machine frame in parallel with the shaft 102. Thus, the shaft 102, first hollow shaft 107 and second hollow shaft 108 are moved upward and downward by rotation of the ball screw shafts 117, 116 and 115, respectively. The ball screw shafts 117 are coupled with a motor 127 through a chain 126 and the ball screw shafts 116 are coupled with a motor 125 through gears 122, 123 and 124. The ball screw shafts 115 are coupled with a motor 121 through a chain 118, a pair of sprockets 119 and a chain 120. Thus, since the ball screw shafts 117, 116 and 115 can be rotated independently of one another by the motors 127, 125 and 121, respectively, the shaft 102, first hollow shaft 107 and second hollow shaft 108 can be moved upward and downward independently of one another.

Hereinbelow, the operation of the coil inserting apparatus K will be described.

Initially, as shown in FIG. 6, coils 129 are placed between the first group blades 104 and the second group blades 106. Then, a stator core 130 is fitted around the blades B so as to be brought into contact with upper ends of wedge guides 131. Subsequently, a core of the stator core 130 is clamped by a core clamp (not shown).

Then, operations for inserting the coils 129 into slots of the stator core 130 are carried out.

Firstly, the upper end 108a of the second hollow shaft 108 is brought into contact with the lower end 105a of the second blade holder 105. After contact by the second hollow shaft 108, the second blade holder 105 is moved further upwardly, so that the second group blades 106 and first group blades 104 are moved upwardly. The second hollow shaft 108 is caused to stop moving upwardly at the time when the first group blades 104 and second group blades 106 are project by a proper distance out of the stator core 130. Namely, the second group blades 106 act as the fixed blades as in the known coil inserting apparatuses.

The first hollow shaft 107 and shaft 102 are caused to continue moving upwardly. The first blade holder 103 is pushed upward by the upper end 107a of the first hollow shaft 107. During a time period when the first blade holder 103 is being pushed upwardly as described above, the first group blades 104 secured to the first blade holder 103 act as the movable blades as in the known coil inserting apparatuses and reduce the a resistance force applied to the coils 129 in the process for inserting the coils 129 into the slots of the stator core 130.

The first blade holder 103 having the first group blades 104 secured thereto can be operated arbitrarily, provided that the first blade holder 103 satisfies conditions that the first blade holder 103 is disposed below the coil pusher 101 and above the second blade holder 105.

After the coil pusher 101 is pushed upward by the shaft 102 until the coils 129 have been completely inserted into the slots of the stator core 130, the shaft 102 is caused to stop moving upward.

Then the operation of moving the coil pusher 101, first blade holder 103 and second blade holder 105 after completion of the coil insertion are carried out.

The shaft 102, first hollow shaft 107 and second hollow shaft 108 which have driven the coil pusher 102, first blade holder 103 and second blade holder 105 upwardly to their upper limits, are respectively moved downwardly. Since the first group blades 104 and second group blades 106 are held in close contact with the wedge guides 131 at this time, it is difficult to lower the first blade holder 103 and second blade holder 105 due to their own weight after the first hollow shaft 107 and second hollow shaft 108 have been lowered. Accordingly, the first blade holder 103 and second blade holder 105 are pushed downwards sequentially by the coil pusher 101 secured to the shaft 102 and thus the coil pusher 102, first blade holder 103 and second blade holder 105 are returned to their initial predetermined positions.

Figure 8:
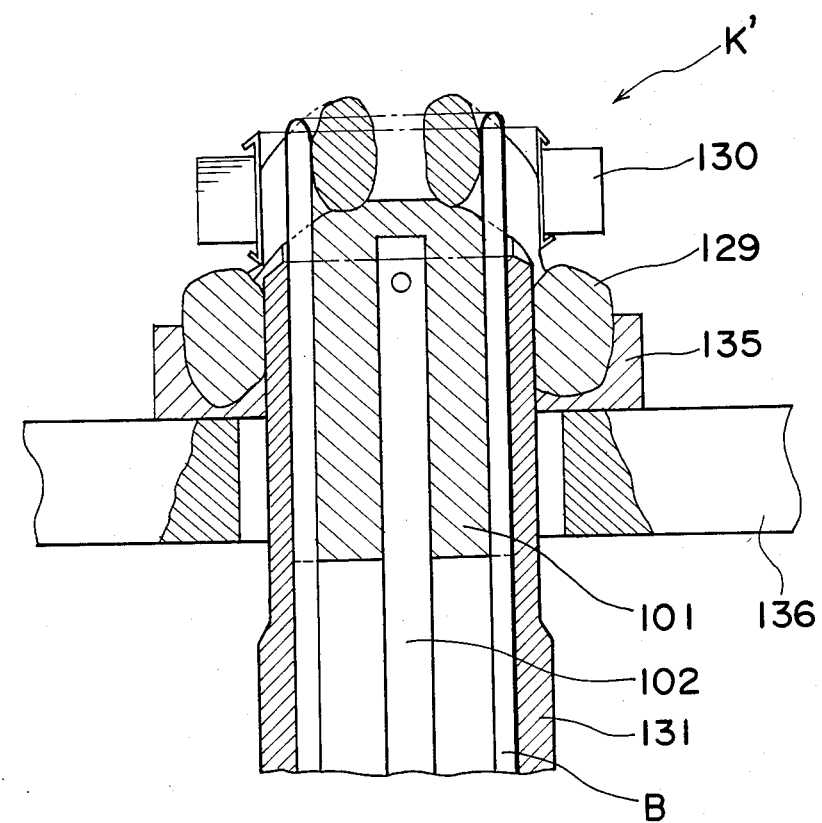
FIG. 8 is a view similar to FIG. 6, particularly showing a modification thereof.

Referring now to FIG. 8, there is shown a coil inserting apparatus K' which is a modification of the coil inserting apparatus K. The coil inserting apparatus K' includes a housing 135 for receiving the coils 129 therein a plate 136 to which the housing 135 is secured. The plate 136 is provided with an opening to permit the wedge guides 131 to pass therethrough and is moved upward and downward by a driving member (not shown). The housing 135 is fitted around the wedge guides 131 so as to be slidable upwardly and downwardly. It should be noted that, at the time when approximately a half portion of each of the coils 129 is inserted into each of the slots of the stator core 130, the largest force is required for inserting the coils into the slots of the stator core 130. In the coil inserting apparatus K', at this time, the plate 136, and with it the housing 135 is moved upward faster than the coil pusher 101 so as to push the lower portions of the coils 129 upward so that the reaction force applied to the coil pusher 101 is reduced greatly.

In accordance with the present invention, since the coil pusher and the first blade holder and the second blade holder are driven by the rotary driving means which can be controlled easily, the speed of the coil pusher and the blades can be set to an optimum value for inserting the coils into the slots of the stator core in the coil inserting process.

Furthermore, in accordance with the present invention, since the rotary driving means for the coil pusher, first blade holder and second blade holder, and the mechanism for converting the rotary motion into the linear motion are employed in the coil inserting apparatus, the overall length of the coil inserting apparatus can be decreased to a minimum.

Moreover, in accordance with the present invention, since the shaft for driving the coil pusher, the first hollow shaft for driving the first group blades and the second hollow shaft for driving the second group blades have a substantially common axis, the coil inserting apparatus can be applied to coil pushers which are relatively small in size to work on stator cores which are relatively small in size.

In accordance with the present invention, since the lower portions of the coils are pushed upward faster than the coil pusher by the housing at the time when approximately half of each of the coils is inserted into each of the slots of the stator core with the greatest force being required for inserting the coils into the slots, the reaction force applied to the coil pusher and the resistance force against insertion of the coils into the slots are reduced greatly.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A coil inserting apparatus for inserting coils into slots of a stator core of a rotary electric machine, comprising:

a plurality of blade members arranged in an annular configuration and spaced at predetermined intervals for guiding a coil into the slots in the core of the rotary electric machine, the blade members being divided into a plurality of groups of blade members;

a coil pusher within said annular configuration and vertically reciprocable in the axial direction of said blade members for inserting the coil into the slots under pressure by utilizing said blade members as guides;

separate blade holders, one for each group of blade members, and to which the blade members of the respective groups are attached, said blade holders being within said annular configuration one below the other beneath said coil pusher and being movable in the axial direction of said blade members independently of each other, the successive blade holders having successively larger bores through the centers thereof in the downward direction;

a pusher driving shaft extending through said bores to and on which said coil pusher is mounted;

a plurality of concentric hollow driving shafts, one for each blade holder, around said pusher driving shaft, the diameters of the shafts having a size to permit the respective hollow driving shafts to pass through the bores in the blade holders below the corresponding blade holder, whereby when a particular hollow shaft is raised, it will raise only the corresponding blade holder and the blade holders above it and the coil pusher;

rotary driving means for each of said shafts operable independently of each other; and motion converting means for each shaft and connected between the respective shafts and the corresponding rotary driving mechanisms for converting the rotary motion of the driving means to linear motion for linearly moving the respective shafts.

2. A coil inserting apparatus as claimed in claim 1 further comprising:
- a plurality of wedge guides, one for each blade, and in an annular array around said blades;
- a coil receiving housing around said wedge guides for receiving the lower ends of coils to be inserted into the stator core; and
- housing driving means connected to said housing for driving said housing along said wedge guides in the direction of said blades independently of said blade holders.

* * * * *